United States Patent
Kim et al.

(10) Patent No.: US 12,139,559 B2
(45) Date of Patent: Nov. 12, 2024

(54) CROSSLINKED COLLOIDAL CELLULOSE NANOCRYSTALS AND METHODS OF PREPARATION AND USE THEREOF

(71) Applicant: Board of Trustees of the University of Arkansas, Little Rock, AR (US)

(72) Inventors: Jin-Woo Kim, Fayetteville, AR (US); Joseph Batta-Mpouma, Fayetteville, AR (US); Joshua Sakon, Fayetteville, AR (US)

(73) Assignee: Board of Trustees of the University of Arkansas, Little Rock, AR (US)

( * ) Notice: Subject to any disclaimer, the term of this patent is extended or adjusted under 35 U.S.C. 154(b) by 0 days.

(21) Appl. No.: 17/479,053

(22) Filed: Sep. 20, 2021

(65) Prior Publication Data

US 2022/0162346 A1 May 26, 2022

Related U.S. Application Data

(60) Provisional application No. 63/116,566, filed on Nov. 20, 2020.

(51) Int. Cl.
| | | |
|---|---|---|
| *C08B 15/10* | (2006.01) | |
| *B82Y 40/00* | (2011.01) | |
| *C08B 15/08* | (2006.01) | |
| *C08K 5/07* | (2006.01) | |
| *C08K 5/1515* | (2006.01) | |

(52) U.S. Cl.
CPC .............. *C08B 15/10* (2013.01); *C08B 15/08* (2013.01); *C08K 5/07* (2013.01); *C08K 5/1515* (2013.01); *B82Y 40/00* (2013.01)

(58) Field of Classification Search
CPC .......... C08B 15/08; C08B 15/10; B82Y 40/00
See application file for complete search history.

(56) References Cited

U.S. PATENT DOCUMENTS

| 9,222,174 B2 | 12/2015 | Garner |
| 10,081,880 B2 | 9/2018 | Hamad et al. |
| 10,207,252 B2 | 2/2019 | Mohammed et al. |
| 2007/0254996 A1 | 11/2007 | Nauka et al. |
| 2008/0202579 A1 | 8/2008 | Gur et al. |
| 2012/0244357 A1 | 9/2012 | Leung et al. |
| 2013/0058870 A1 | 3/2013 | Lacroix et al. |
| 2017/0107371 A1 | 4/2017 | Teipel et al. |
| 2018/0216256 A1 | 8/2018 | Shi et al. |
| 2019/0023857 A1 | 1/2019 | Shin et al. |

FOREIGN PATENT DOCUMENTS

WO 2017199252 A1 11/2017

OTHER PUBLICATIONS

Winarti et al., IOP Conf. Ser.: Earth Environ. Sci., 2018, 209, 012043, 10 pages. (Year: 2018).*
Liang et al., ChemSusChem., 2020, 13, p. 78-87, Version of record online: Oct. 4, 2019. (Year: 2019).*
Xu et al., Advances in Colloid and Interface Science, 2020, 275 102076, 14 pages, Available online Nov. 19, 2019. (Year: 2019).*
National Institutes of Health, Laboratory Water: Its Importance and Application, 2013, 22 pages. (Year: 2013).*
Udoetok et al., Ultrasonics—Sonochemistry, 2018, 42, p. 567-576. (Year: 2018).*
Hanif et al., ACS Macro Lett., 2020, 9, p. 146-151. (Year: 2020).*
Beck-Candanedo, S. , et al., "Effect of Reaction Conditions on the Properties and Behavior of Wood Cellulose Nanocrystal Suspensions", Biomacromolecules, vol. 6, 2005, pp. 1048-1054.
Birck, C. , et al., "New Crosslinked Cast Films based on Poly (vinyl alcohol): Preparation and Physicochemical Properties", eXPRESS Polym. Lett., vol. 8, 2014, pp. 941-952.
Chen, S. , et al., "Effects of Crystal Orientation on Cellulose Nanocrystals—Cellulose Acetate Nanocomposite Fibers Prepared by Dry Spinning", Biomacromolecules, vol. 15, 2014, pp. 3827-3835.
Dufresne, A. , "Nanocellulose: A New Ageless Bionanomaterial", Mater. Today, vol. 16, 2013, pp. 220-227.
Eichhorn, S. J., "Cellulose Nanowhiskers: Promising Materials for Advanced Applications", Soft Matter, vol. 7, 2011, pp. 303-315.
Fortunati, E. , et al., "Effects of modified cellulose nanocrystals on the barrier and migration properties of PLA nano-biocomposites", Carbohydr. Polym., vol. 90, No. 2, 2012, pp. 948-956.
George, J. , "Cellulose Nanocrystals: Synthesis, Functional Properties, and Applications", Nanotechnol. Sci. Appl., vol. 8, 2015, pp. 45-54.
Gicquel, E., "Cellulose Nanocrystals as New Bio-based Coating Layer for Improving Fiber-based Mechanical and Barrier Properties", J. Mater. Sci., vol. 52, 2016, pp. 1-14.
Goganian, M. S., et al., "Microwave Promoted Synthesis of Smart Superporous Poly and Study of Kamlet-Abboud-Taft Polarity Functions for Obtained Materials", J. Polym. Res., vol. 21, 2014, pp. 484-494.
Habibi, Y. , et al., "Cellulose Nanocrystals: Chemistry, Self-Assembly, and Applications", Chem. Rev., vol. 110, 2010, pp. 3479-3500.
Hamza, S. E., "Mhd Flow of Cellulose Derivatives and Dilute Suspensions Rheology of Its Nanocrystals", vol. 7, No. 1, 2017, pp. 23-40.

(Continued)

*Primary Examiner* — Jonathan S Lau

(74) *Attorney, Agent, or Firm* — Crowe & Dunlevy, P.C.

(57) ABSTRACT

This invention relates generally to covalently crosslinked colloidal cellulose nanocrystals (xCNC) and methods of preparation and use thereof. The colloidal cellulose nanocrystals (CNCs) are covalently crosslinked in aqueous suspension to generate a network showing tunable physicochemical properties. The xCNC structures are tunable in terms of their physicochemical properties and arrangement within the hydrogel network. The covalent crosslinking of solitary sulfonated (—$OSO_3$) CNCs can be accomplished without prior hydroxyl replacement or functionalization.

40 Claims, 8 Drawing Sheets

(56) References Cited

OTHER PUBLICATIONS

Hoeger, I., et al., "Ultrathin Film Coatings of Aligned Cellulose Nanocrystals from a Convective-Shear Assembly System and their Surface Mechanical Properties", Soft Matter, vol. 7, 2011, pp. 1957-1967.

Kelly, J. A., et al., "Chiral Nematic Stained Glass: Controlling the Optical Properties of Nanocrystalline Cellulose-Templated Materials", Langmuir, vol. 28, 2012, pp. 17256-17262.

Khalil, H. P., et al., "Green Composites from Sustainable Cellulose Nanofibrils: A review", Carbohydr. Polym., vol. 87, 2012, pp. 963-979.

Querejeta-Fernandez, A., et al., "Circular Dichroism of Chiral Nematic Films of Cellulose Nanocrystals Loaded with Plasmonic Nanoparticles", No. Xx, 2015, pp. 10377-10385.

Postek, M. T., et al., "Cellulose Nanocrystals—A Material with Unique Properties and Many Potential Applications", Tappi Press, 2013. [Online]. Available: www.tappi.org. [Accessed: Jan. 1, 2017].

Moon, R. J., et al., "Cellulose Nanomaterials Review: Structure, Properties and Nanocomposites", Chem. Soc. Rev., vol. 40, 2011, pp. 3941-3994.

Natarajan, B., et al., "Dielectric Characterization of Confined Water in Chiral Cellulose Nanocrystal Films", ACS Appl. Mater. Interfaces, vol. 9, 2017, pp. 14222-14231.

Rimdusit, S., "Biodegradability and Property Characterizations of Methyl Cellulose: Effect of Nanocompositing and Chemical Crosslinking", Carbohydr. Polym., vol. 72, 2008, pp. 444-455.

Rojas, J., et al., "Functionalization and Crosslinking of Microcrystalline Cellulose in Aqueous Media: A Safe and Economic Approach", Int. J. Pharm. Sci. Rev. Research, vol. 8, 2011, pp. 28-36.

Sinha, A., et al., "Cellulose Nanocrystals as Advanced 'Green' Materials for Biological and Biomedical Engineering Cellulose", J. Biosyst. Eng., vol. 40,, 2015, pp. 373-393, 2015.

Siqueira, G., et al., "Cellulosic Bionanocomposites: A Review of Preparation, Properties and Applications", Polymers (Basel)., vol. 2,, 2010, pp. 728-765.

Wang, S., et al., "Preparation of a Crosslinking Cassava Starch Adhesive and its Application in Coating Paper", BioResources, vol. 8, 2013, pp. 3574-3589.

Yang, X., et al., "Chemically Cross-Linked Cellulose Nanocrystal Aerogels with Shape Recovery and Superabsorbent Properties", Chem. Mater., vol. 26, 2014, pp. 6016-6025.

Zhang, Y., et al., "Cellulose Nanofibrils: From Strong Materials to Bioactive Surfaces **,", J. Renew. Mater, vol. 1, 2013, pp. 195-211.

Zhou, Y., et al., "Recyclable Organic Solar Cells on Cellulose Nanocrystal Substrates", Sci. Rep., vol. 3, 2013, pp. 1536-1541.

Zhang, Y., et al., "Crosslinking Reaction of Poly (vinyl alcohol) with Glyoxal", J. Polym. Res., vol. 17, 2010, pp. 725-730.

Wang, Taoran, et al., "Optimization of bleaching process for cellulose extraction from apple and kale pomace and evaluation of their potentials as film forming materials", Carbohydrate Polymers, vol. 253, Feb. 1, 2021, 117225 (Abstract).

\* cited by examiner

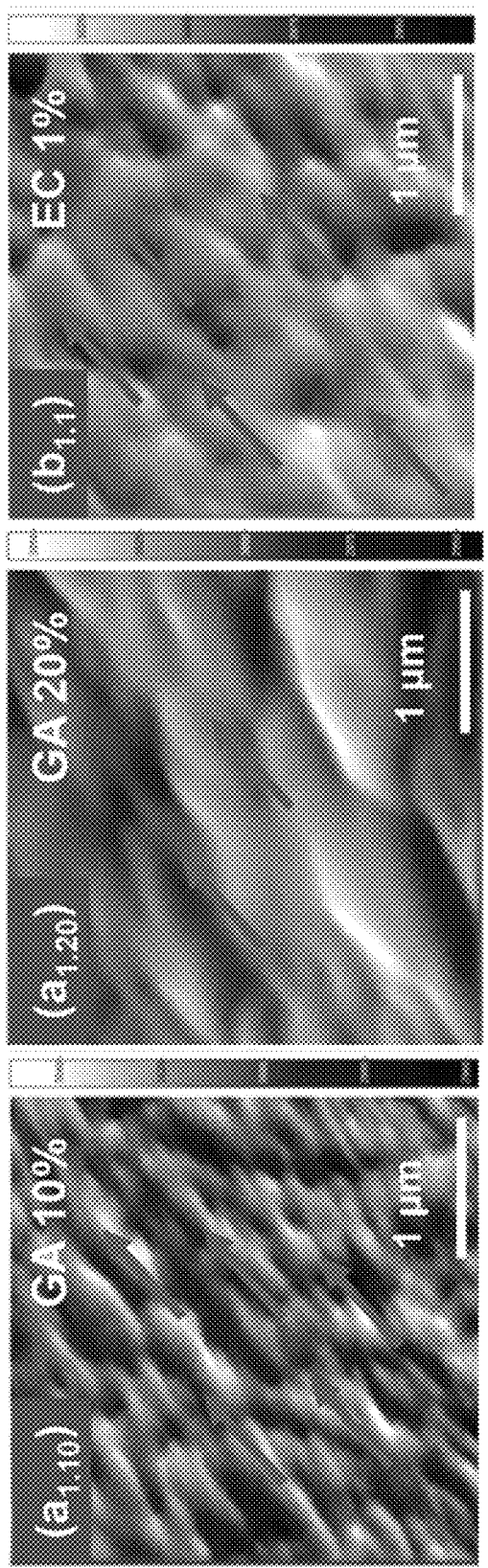

CROSSLINKED COLLOIDAL CELLULOSE NANOCRYSTALS AND METHODS OF PREPARATION AND USE THEREOF

CROSS REFERENCE TO RELATED APPLICATIONS

This application claims the benefit of U.S. Provisional Patent Application No. 63/116,566 filed on Nov. 20, 2020. This application incorporates the foregoing application by reference into this document as if fully set out at this point.

GOVERNMENT LICENSE RIGHTS

This invention was made with U.S. Government support under OIA-1457888 awarded by the National Science Foundation (NSF). The Government has certain rights in this invention.

BACKGROUND OF THE INVENTION

1. Field of the Invention

This invention relates generally to covalently crosslinked colloidal cellulose nanocrystals and methods of preparation and use thereof.

2. Description of the Related Art

When cellulose nanocrystals (CNCs) self-assemble into structures, they collapse in moist environments due to their hydroxyl (OH) rich surface, limiting CNCs use to dry media. A challenging issue is the formation of structures made solely or largely of CNCs and their practical uses and adaptability in a variety of media. The development of processes and technologies for the creation of advanced materials and devices that are non-petroleum-based have been sought after to engineer eco-friendly and better-quality products. CNC, a subunit of cellulose, which is the most profuse natural polymer on earth, is a good candidate to fulfill this need. Over the past decade, fundamental and application-oriented research on CNC has expanded immensely, showing its potential for applications in multiple industries, from agriculture and textile to optoelectronics and biomedicine to filtration and packaging.

CNCs, extracted from agriculture or forestry waste, are plant-based, non-toxic and biodegradable nanoparticles that have received increasing attention for their ability to self-assemble into structures with multiple applications. CNCs are sub-units of cellulose, which is one of the most profuse natural polymers on earth. Cellulose is an affordable and environmentally friendly polysaccharide that is naturally composed of glucoses arranged in $\beta$ (1-4) linkage.

Compared to synthetic polymers derived from declining petroleum-based resources, cellulosic materials like CNCs are cost-effective and environmentally friendly alternative. CNCs are made from mechanical, chemical, and enzymatic treatments of cellulose, which is the most abundant polymer on earth. Depending on the source, CNCs have a size variation in the range of 2-20 nm in width, and 100 nm-500 nm in length. CNC materials have been used as good fillers for petroleum-based and biopolymers polymers, and sought after for their physicochemical, rheological and mechanical properties, making them an attractive choice to develop composite materials, and serving for multiple applications such as biological tissue scaffolds, light guided propagation and dielectric insulator materials, as well as water absorbent and delivery systems, to name a few.

As noted above, CNCs offer a OH group surface that is amenable and suitable for surface functionalization. CNCs phase behavior and liquid crystal state are inclined to the formation of gel-like materials, which are held together by hydrogen (H) bonds to self-assemble into a structure. The chemical nature and reactivity of CNCs are defined by the presence of three OH groups in the glucose units, one primary and two secondary groups. The OH groups play a key role in their hydrophilicity and functionalization with other molecules. The intramolecular H-bond interactions in CNCs are responsible for the observed relative stiffness and rigidity. The intermolecular H-bond interactions are the major contributors to the organization of CNCs networks, holding the interactions among CNCs as the predominant factor responsible for uniform and stacked packing, and leading to a strong tendency to form highly ordered structures. Aside their chemical properties, CNCs have shown particular interest as core building block materials to make 2D and 3D structures because of a plethora of characteristics such as low density at 1.59 g/cm$^3$, low coefficient of thermal expansion around 1 ppm/K and porosity with high surface area of (30-600 m$^2$/g). Additionally, CNCs have been used as fillers and reinforcing materials to make composites with mechanically weak polymers. CNCs show tensile strength in the range of 7.5-7.7 GPa, which shows similarities with that of para-aramid (Kevlar) and steel, with elastic modulus in the longitudinal and transverse direction of 110-220 GPa and 10-50 GPa, respectively.

Although CNCs are known for their physicochemical properties, their usage is restricted to dry environment applications. When self-assembled into a structure, CNCs collapse in contact with moisture due to adsorption and absorption by H-bond interactions. It has been reported that crosslinking hydroxyl-rich polymer has been achieved in order to improve their physicochemical, mechanical properties and structural stability in aqueous environment. Furthermore, crosslinking of surface hydroxyl-rich polymers, including native cellulose, has been reported. Crosslinking engenders networks between adjacent molecules in the presence of crosslinkers and catalysts under temperatures that trigger the linking process.

CNCs have been crosslinked in the presence of one or more OH— rich material, such as glycerol, polyethylene glycol, sorbitol, polyvinyl alcohol (PVOH), polycarboxylate ether, carbohydrates, and borax to name a few in order to create a network in which CNCs were associated to OH-rich material via covalent bonding. Carboxylic acids were found to be good crosslinking agents, whereas the polycarboxylic acid 1,2,3,4-butanetetracarboxylic acid (BTCA) was found to be one of the best performing polycarboxylic acids. Colloidal CNCs were crosslinked among themselves without the need of other OH-rich materials, using di-aldehyde and epoxide crosslinking agents.

Aldehyde and hydrazide functionalized-CNCs have also been connected without the use of a crosslinker, forming superabsorbent and shape memory aerogels via hydrazone crosslinking. Although this study discussed and reported increased in mechanical properties, as well as the aptitude to use structures in moist environment, there has not been any case of covalently crosslinking sulfonated or colloidal CNCs, nor any study correlated to their self-alignment upon crosslinking vis-à-vis interface modification at their intermolecular H-bonds. Although there is a wide range of crosslinkers, most used and well known in the cellulose industry are di-aldehyde- and epoxide-based crosslinkers, namely glutaraldehyde (GA) and epichlorohydrin (EC), respectively. Currently, these two molecules are used for chemical crosslinking under rules set by the United States Food and Drug Administration (FDA).

Thus, there is a need for CNC networks that can generate tunable surface chemistry properties for water stable structures with multiple functions, rendering their potential as an alternative to petroleum-based polymers with practical use in dry and wet environments.

It is therefore desirable to provide covalently crosslinked colloidal cellulose nanocrystals and methods of preparation and use thereof.

It is further desirable to provide CNCs that are covalently crosslinked in aqueous suspension to generate a network showing tunable physicochemical properties. The xCNC structures compared to pure CNCs have tunability in terms of their physicochemical properties and arrangement within the hydrogel network. The covalent crosslinking of solitary —$OSO_3$ CNCs can be accomplished without prior hydroxyl replacement or functionalization.

Before proceeding to a detailed description of the invention, however, it should be noted and remembered that the description of the invention which follows, together with the accompanying drawings, should not be construed as limiting the invention to the examples (or embodiments) shown and described. Those skilled in the art to which the invention pertains will be able to devise other forms of this invention within the ambit of the appended claims.

SUMMARY OF THE INVENTION

In general, in a first aspect, the invention relates to a method for preparing crosslinked cellulose nanocrystals (xCNCs). The method includes preparing or providing a suspension of cellulose nanocrystals (CNCs) in an aqueous medium, such as deionized water. The method then ia) adjusts the CNC suspension to an acidic pH; and, optionally with heating, ib) mixes the CNC suspension of step ia) with a dialdehyde crosslinker under the acidic pH. Alternatively, the method then iia) adjusts the CNC suspension to an alkaline pH; and, optionally with heating, iib) mixes the CNC suspension of step iia) with an epoxide-based crosslinker under the alkaline pH. Lastly, the method isolates the xCNCs after step ib) or step iib).

The CNCs can be positively or negatively charged, sulfonated CNCs. The dialdehyde crosslinker may be glyoxal, malondialdehyde, succinaldehyde, clavaldehyde, adipaldehyde, suberaldehyde, glutaraldehyde, or a mixture thereof. The epoxide-based crosslinker may be epichlorohydrin, polyepichlorohydrin, an epoxyalkane, allyl glycidyl ether, alkyl glycidyl ether, cycloalkene oxide, 1,3-butanediene diepoxide, epoxidized oils, or a mixture thereof. The heating step ib) or iib) may be from about 60° C. to about 160° C. The alkaline pH may be from about 7 to about 10, and the adjusting step iia) may be conducted with a Lewis base, a monoacidic base, a diacidic base, or a mixture or combination thereof, such as sodium, calcium, potassium, and barium hydroxides. The acidic pH may be from about 2 to about 7, and the adjusting step ia) may be conducted with a Lewis acid, a mineral acid, a carboxylic acid, or a mixture or combination thereof, such as hydrochloric, formic, acetic, and nitric acids. The isolating step can include precipitation, filtration or centrifugation, or a combination thereof. The method can also include selectively tuning the degree of crosslinking between the sulfonated CNC suspension and the dialdehyde crosslinker of step ib) or the epoxide-based crosslinker of step iib).

In general, in a second aspect, the invention relates to a xCNCs prepared by the method described above.

The foregoing has outlined in broad terms some of the more important features of the invention disclosed herein so that the detailed description that follows may be more clearly understood, and so that the contribution of the instant inventors to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

These and further aspects of the invention are described in detail in the following examples and accompanying drawings.

FIG. 4D is an atomic force microscopic height image of a xCNC film in accordance with an illustrative embodiment of the invention disclosed herein with GA 10% having an Rq of 31.46±1.08 nm.

FIG. 4E is an atomic force microscopic height image of a xCNC film in accordance with an illustrative embodiment of the invention disclosed herein with GA 20% having an Rq of 33.19±0.97 nm.

FIG. 4F is an atomic force microscopic height image of a xCNC film in accordance with an illustrative embodiment of the invention disclosed herein with EC 1% having an Rq of 23.79±0.14 nm.

DETAILED DESCRIPTION OF THE INVENTION

Figure 1:
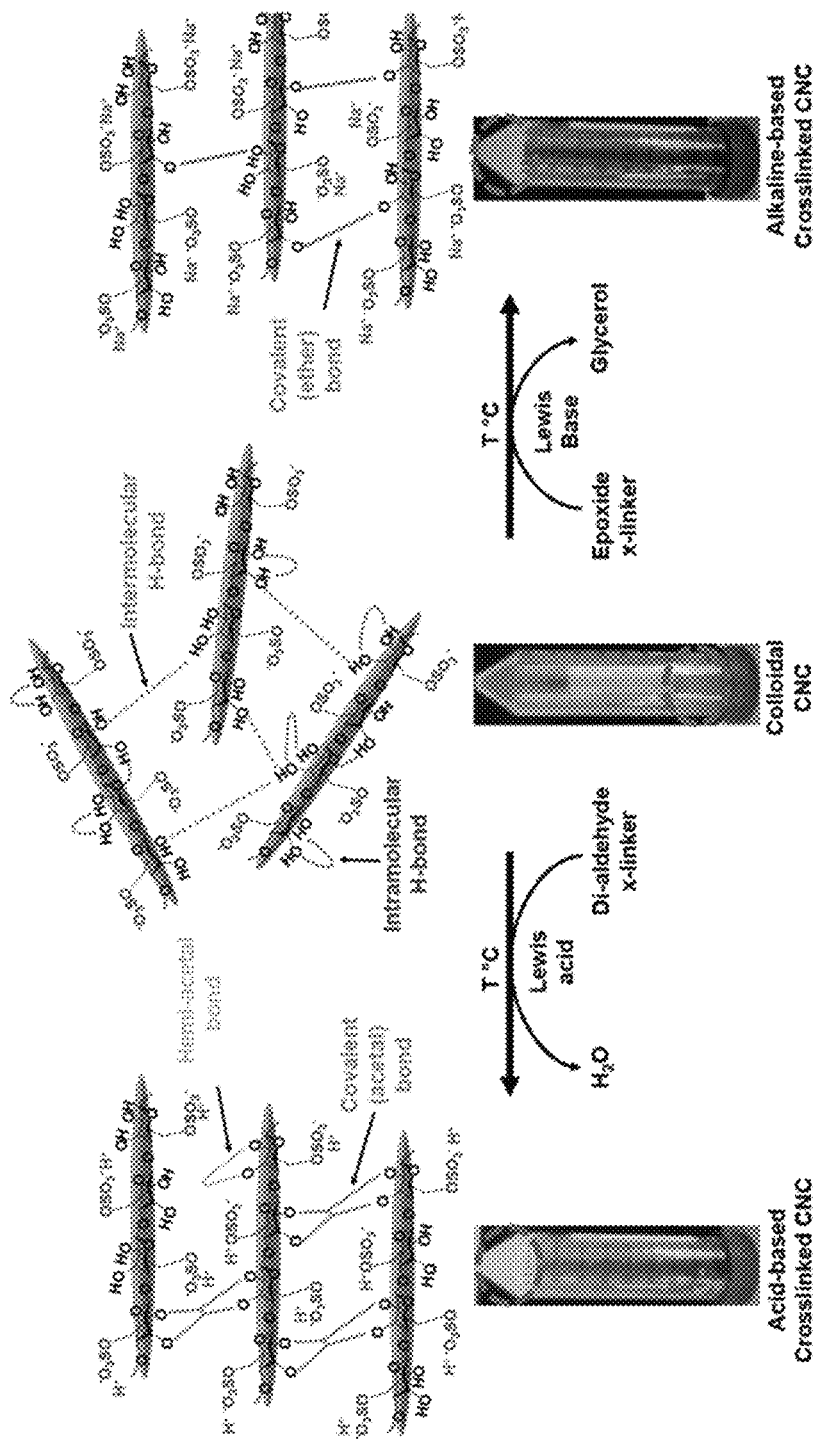
FIG. 1 is a schematic illustration of an exemplary surface chemistry modification, and the resulting crosslinked (x) CNC hydrogels in accordance with an illustrative embodiment of the invention disclosed herein.

While this invention is susceptible of embodiment in many different forms, there is shown in the drawings, and will be described hereinafter in detail, some specific embodiments of the instant invention. It should be understood, however, that the present disclosure is to be considered an exemplification of the principles of the invention and is not intended to limit the invention to the specific embodiments so described.

The invention relates generally to covalently crosslinked colloidal cellulose nanocrystals (CNCs) and methods of preparation and use thereof. The inventive methods crosslink colloidal CNCs to achieve water stable and oriented particles in a structure. The covalent connection of colloidal CNCs with crosslinking agents in alkaline and acidic pH improves their use in wet environments when the CNCs self-assemble into structures. This crosslinking method forms strong bonds that connect individual CNCs to form a structural network with controllable H-bond interactions and stable structures in a humid medium. CNCs have shown a worldwide interest as bio-based nanomaterials due to their physicochemical properties such as biodegradability, low density, modifiable surface chemistry, optical birefringence, and mechanical strength, to name a few. Many industrial sectors that are in the trend to replace petroleum-based polymers with sustainable and biodegradable products will benefit from the disclosed inventions, which is relevant for applications in packaging, textile, optoelectronics, biomedicine, and agriculture, among others.

The inventive crosslinked CNC (xCNC) is a semi-solid fluid or hydrogel with fluid flow that can be used as coatings or building blocks for extrudable materials. Ultimately, the xCNC can be used alone or with another biopolymer to make composites for food, pharmaceutical and/or electronic packaging, as well as for water purification and moisture barrier. These composites of xCNC and biopolymers can be engineered into films, beads, and/or fibers. When varied CNC and crosslinking agent concentrations are used, stable networks of CNCs are formed with different H-bond intensity or structure stability in contact with water, making them practical both in dry and wet environment. Additional advantages of using the xCNC network are that these materials are derived from renewable sources, are fully biodegradable and non-toxic to the natural environment. Hydrogels are highly absorbent and can contain over 99% water. Additionally, hydrogels possess a degree of flexibility very similar to natural tissue, due to their significant water content. Because of these properties, xCNC hydrogels can be used as scaffolds for cell/tissue growth in tissue engineering and tissue repair. As such, hydrogels will be used to make structures that include a porous network, allowing cells to grow throughout the hydrogel, or building encapsulating systems with a control release of drugs. The same porous system can be exploited to make coating surface with tunable roughness and wetting properties, allowing to control light absorption for optical propagators, as well as solar cells.

The inventive methods crosslink adjacent sulfonated ($-OSO_3$) CNCs from their OH groups, either between carbons C6 (OH) and C'3 (OH) or C6 (OH) and C'2 (OH), producing crosslinked CNC (xCNC) hydrogels. The preparation methods are based on acidic and alkaline-based chemistry, using as crosslinking agent such as a di-aldehyde (e.g., glutaraldehyde, GA) or an epoxide (e.g., epichlorohydrin, EC). As used herein, the term "hydrogel" refers to an aqueous network of xCNCs, and "crosslinking" refers to intermolecularly connected CNCs.

The inventive crosslinked CNCs (xCNCs) are covalently crosslinked in aqueous suspension to generate a network showing tunable physicochemical properties. The xCNC structures have tunability in terms of their physicochemical properties and arrangement within the hydrogel network compared to pure CNCs. Moreover, the covalent crosslinking of solitary sulfonated ($-OSO_3$) CNCs can be accomplished without prior hydroxyl replacement or further surface functionalization.

EXAMPLES

The covalently crosslinked colloidal cellulose nanocrystals and methods of preparation and use thereof are further illustrated by the following examples, which are provided for the purpose of demonstration rather than limitation.

As a model, a suspension of sulfonated ($-OSO_3$) CNCs was prepared by hydrolyzing microcrystalline cellulose with 64 wt. % sulfuric acid at 45° C. After centrifugation and dialyses, the obtained $-OSO_3$ CNCs had a neutral pH and zeta potential of −46.2±3.1 mV with size dimensions of 108.14±49.84 nm in length and 12.7±2.67 nm in width. In another aspect, positively or negatively charged CNCs that are extracted from biomass or any cellulosic source can be used as building blocks alone or combined with amine ($NH_2$)-terminated molecule, including proteins, and peptides.

The pH of 5 ml CNC suspensions of 1%, 3%, and 6% (w/w) were adjusted to 2.5 with HCl (0.5M) for glutaraldehyde (GA) and 10 with NaOH (1M) for epichlorohydrin (EC), for the acidic and alkaline-based conditions of crosslinking, respectively. This was followed by a gentle shake to make a uniform suspension. In another aspect, these CNC concentrations can be used for any isotropic (less than 3% w/w) or anisotropic (more than 3% w/w) phase of positively or negatively CNC suspensions.

GA and EC were respectively added to make final crosslinker concentrations of 1%, 4%, 10%, and 20% (w/w) with respect to CNC weight, i.e., gram crosslinker per gram CNC. In a non-exhaustive list, GA can be substituted to other dialdehydes such as glyoxal, malondialdehyde, succinaldehyde, clavaldehyde, adipaldehyde, and suberaldehyde, to name a few. Similarly, EC can be substituted with polyepichlorohydrin and other epoxyalkanes as well as a catalog of epoxides such allyl glycidyl ether, alkyl glycidyl ether, cycloalkene oxide, 1,3-butanediene diepoxide, and epoxidized oils, to name a few. Aside from di-aldehydes and epoxides, other crosslinkers that are suitable for crosslinking molecules from their hydroxyl groups through esterification and etherification reactions, such as polycarboxylic acids, phosphorus derivatives, and silica or silane derivatives, can be employed.

The final mixture was incubated overnight under continuous stirring of 150 rpm at 60° C. In another aspect, any incubation temperature from about 60° C. to about 160° C. can be used. The reaction was stopped by addition of 70% ethanol. The resulting solution was three times washed with deionized water 18 MΩ with by centrifugation at 9,000 rpm for 10 min, the supernatant was discarded, and the crosslinked CNC (xCNC) hydrogel was stored at 4° C. Sulfonated CNC suspensions were crosslinked from their intermolecular H-bond, resulting in hydrogels and their crosslinking degree was determined using rheological characterization.

Figures 2A, 2B:
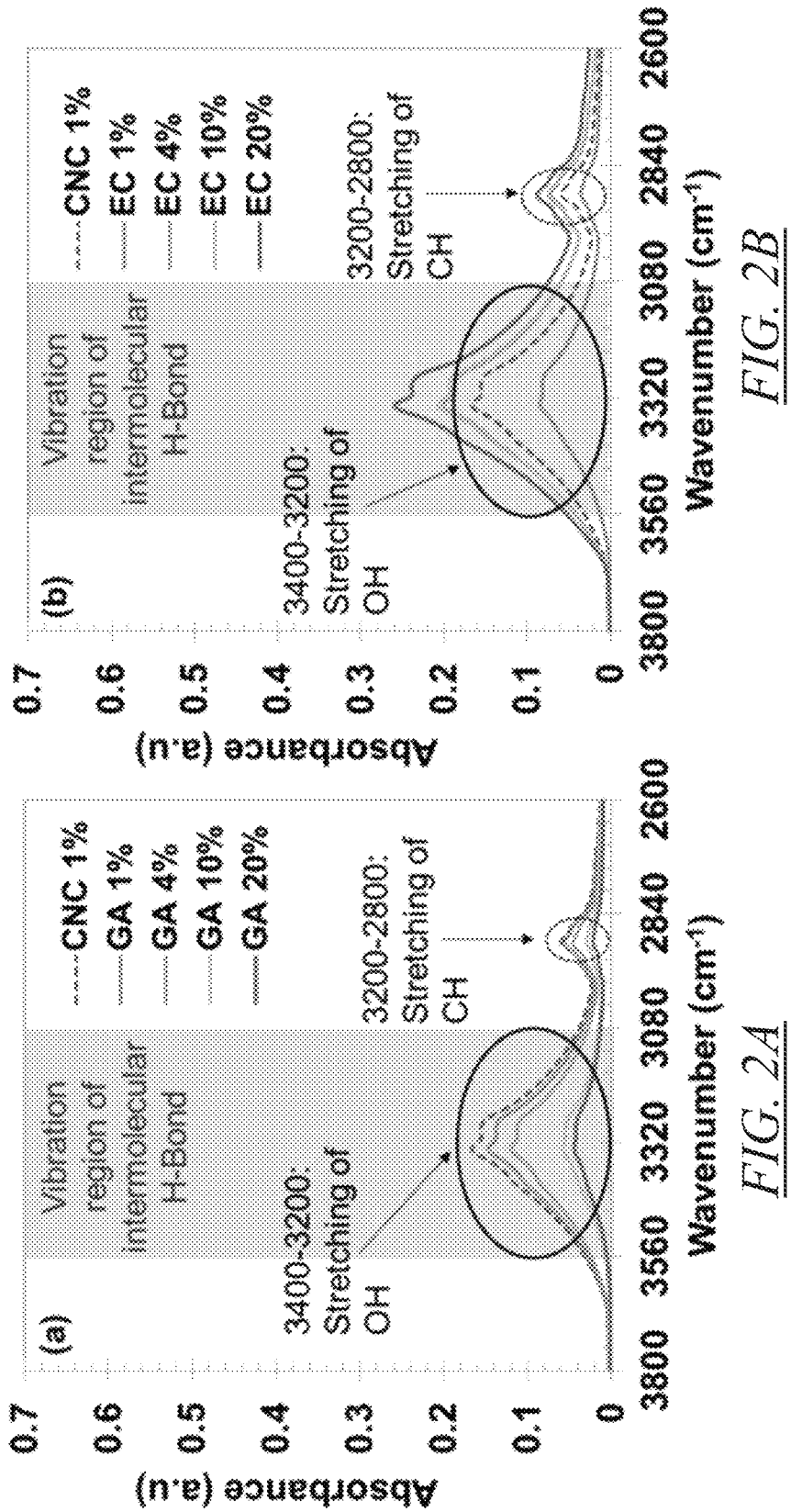
FIG. 2A is a graphical representation illustrating dynamic storage (G') and loss (G") moduli versus angular frequency (w) using crosslinker glutaraldehyde (GA), where generally G' is associated with energy storage for an in-phase elastic modulus and release in the periodic deformation, and G" is associated with the dissipation of energy as heat for an out of phase elastic modulus.
FIG. 2B is a graphical representation illustrating dynamic storage (G') and loss (G") moduli versus angular frequency (w) using crosslinker epichlorohydrin (EC), where generally G' is associated with energy storage for an in-phase elastic modulus and release in the periodic deformation, and G" is associated with the dissipation of energy as heat for an out of-phase elastic modulus.

As shown in FIGS. 2A and 2B, control CNC at 1% showed increasing dynamic moduli as the frequency increased with the loss modulus (G") higher than the storage modulus (G'), confirming a more liquid like and slip-slip behavior between particles that interact through intermolecular H-bonds. Viscoelastic behavior showed varied structural deformations with a tunable crosslinking degree in the value ranges of 60%-90%, and 75%-95%, for GA and EC, respectively.

Figures 3A, 3B:
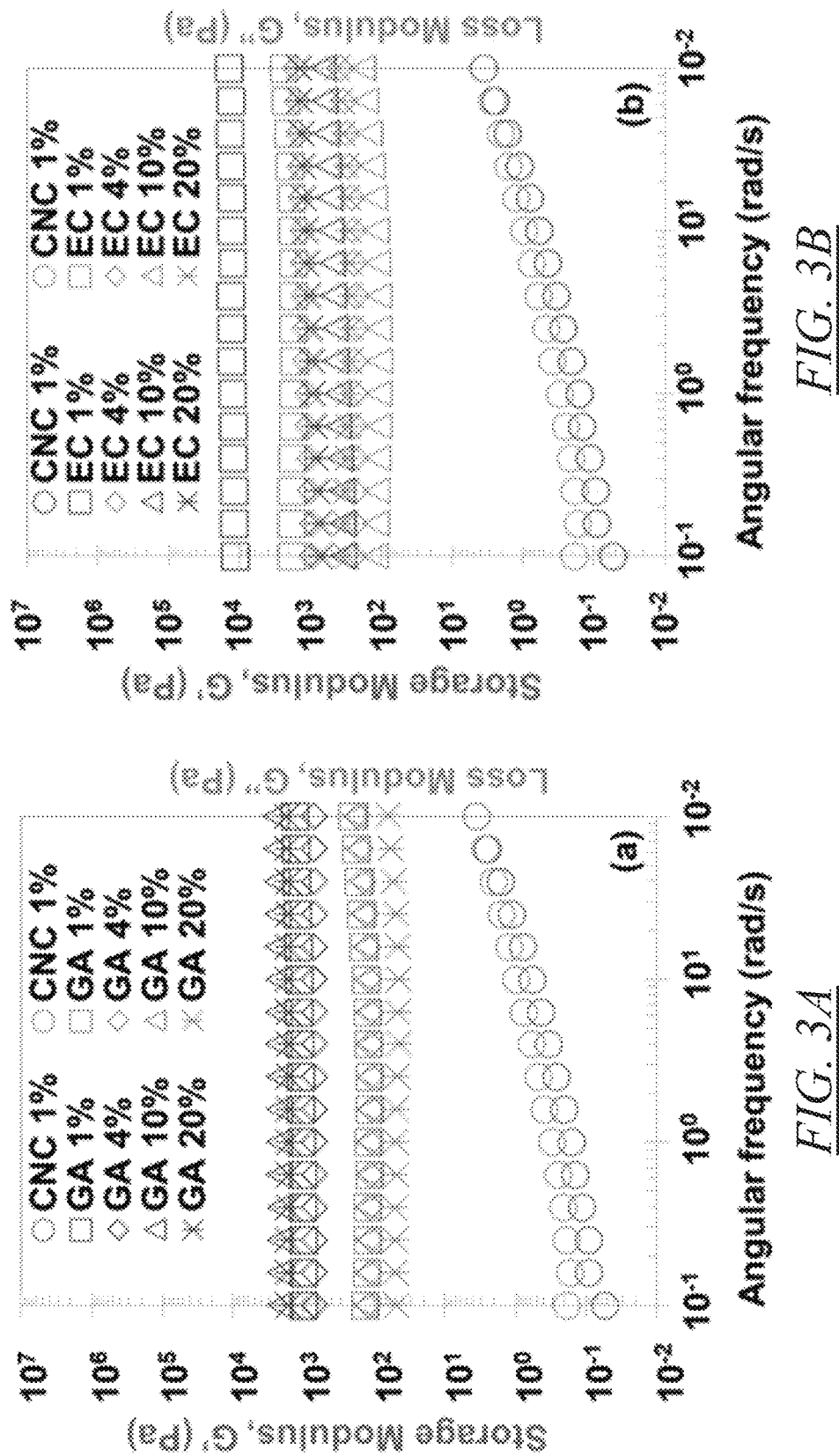
FIG. 3A is a graphical representation of a Fourier transform infrared spectroscopy of pristine and xCNCs with GA as the crosslinker.
FIG. 3B is a graphical representation of a Fourier transform infrared spectroscopy of pristine and xCNCs with EC as the crosslinker.
Figures 4A, 4B, 4C:
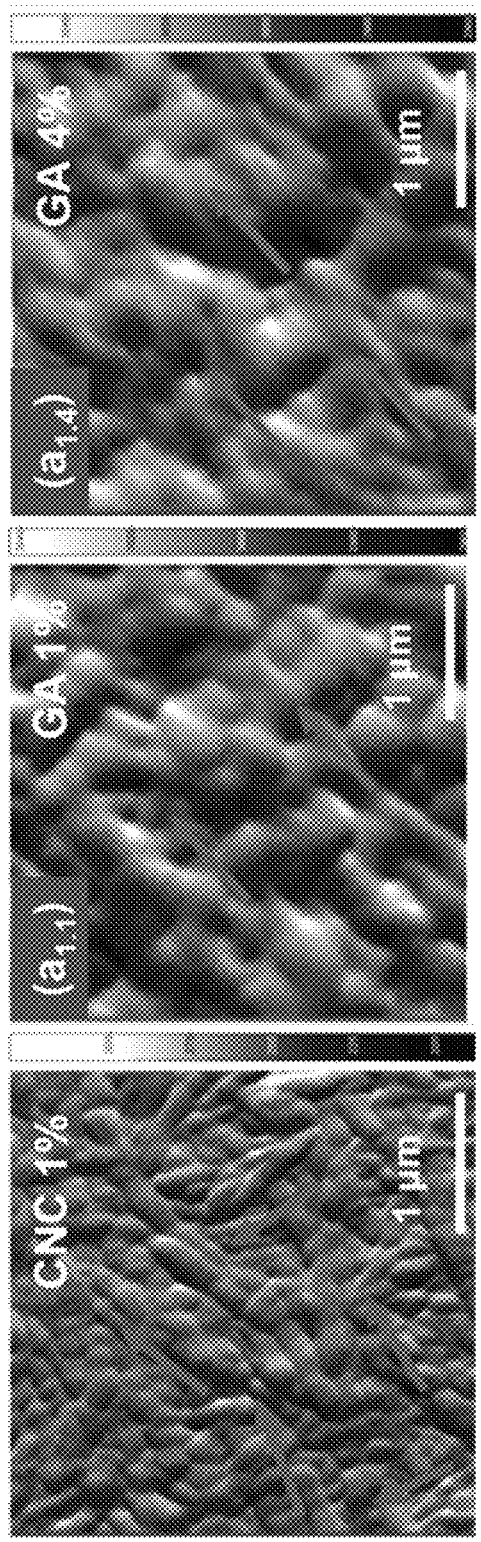
FIG. 4A is an atomic force microscopic height image of a CNC film with CNC 1% having a root mean square (RMS) surface roughness (Rq) of 3.18±0.41 nm.
FIG. 4B is an atomic force microscopic height image of a xCNC film in accordance with an illustrative embodiment of the invention disclosed herein with GA 1% having an Rq of 7.31±0.22 nm.
FIG. 4C is an atomic force microscopic height image of a xCNC film in accordance with an illustrative embodiment of the invention disclosed herein with GA 4% having an Rq of 12.72±0.19 nm.
Figures 4G, 4H, 4I:
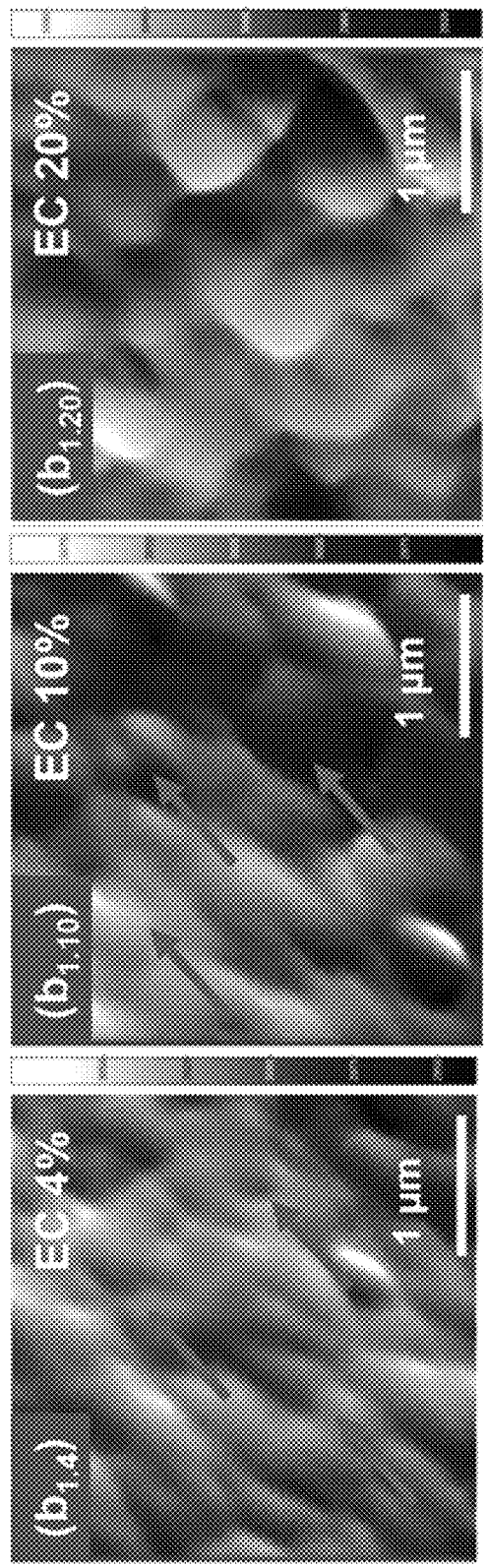
FIG. 4G is an atomic force microscopic height image of a xCNC film in accordance with an illustrative embodiment of the invention disclosed herein with EC 4% having an Rq of 20.64±0.27 nm.
FIG. 4H is an atomic force microscopic height image of a xCNC film in accordance with an illustrative embodiment of the invention disclosed herein with EC 10% having an Rq of 10.68±0.13 nm.
FIG. 4I is an atomic force microscopic height image of a xCNC film in accordance with an illustrative embodiment of the invention disclosed herein with EC 20% having an Rq of 9.52±0.15 nm.

The mechanism of crosslinking is based on the formation of acetal and ether bonds between crosslinkers and nearby OH-terminated molecules. As shown and discussed in FIGS. 3A and 3B, FTIR was used to evaluate the state of chemical bonding upon crosslinking. The O—H stretching band in the region 3600-3000 cm$^{-1}$ was found to vary in width and intensity depending on the type of crosslinker used. The band spectra from 3600-3000 cm$^{-1}$ are recognized for the stretching of bonded O—H, 3000-2800 cm$^{-1}$ to the C—H stretching. When the concentration of GA increased (FIG. 3A), spectrum showed the reduction of intensity peaks for intermolecular H-bond for. The contrary was observed in with an augmentation of the intensity peak for increasing EC concentrations (FIG. 3B), suggesting the substitution of OH groups from adjacent CNC by the hydroxypropyl ether bridge, and formation of glycerol as a byproduct of the crosslinking process.

As shown and discussed in FIGS. 4A-4I, self-assembled nanocrystals were aligned under a set of conditions of CNCs and crosslinker types and concentrations. The arrows in each image represent the directionality of rods, either for pure or crosslinked CNCs (xCNCs). Samples treated with crosslinkers GA10% (FIG. 4D) and EC1% (FIG. 4F), appeared to show the greatest alignment and staked rods, confirming this organization is related to the intermolecular connection between adjacent CNCs, and leading to tunable surface physical properties that can be evaluated through surface roughness analyses. Below each image, it is shown the root mean square (RMS) surface roughness (Rq) of CNC and xCNC samples. Because of the linear rod-like morphology, nano-scale size, and interparticle H bonds, xCNC particles showed a propensity to pack tightly during film formation, resulting in surface properties that depend not only on their molecular construct, but also on their chemical constituents. Additionally, this indicates that Rq of CNC films can be tuned by varying crosslinking conditions, allowing to have a surface that is advantageous for biological applications that require hydrophilicity with a suitable roughness to promote cell growth, an encapsulating system with a controlled release of drugs, or a moisture barrier for electronics.

Figures 5A, 5B:
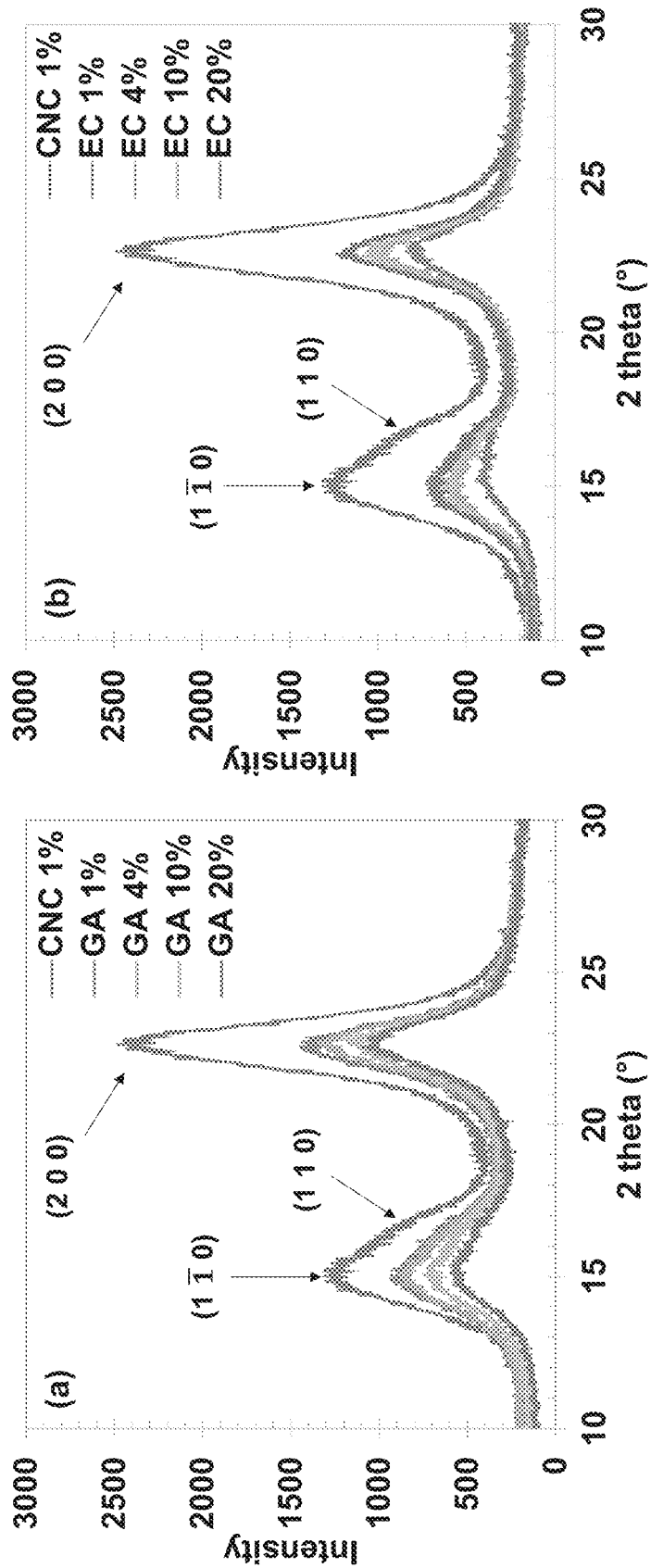
FIG. 5A is a graphical representation of the X-Ray diffractograms of CNC and xCNC for GA at its varied concentration.
FIG. 5B is a graphical representation of the X-Ray diffractograms of CNC and xCNC for EC at its varied concentration.

As shown in FIGS. 5A and 5B, CNC surface modification occurs at the accessible OH— groups, which is the site for the CNC crosslinking. Because CNC 1% showed better values in terms of crosslinking degree, X-ray diffractometry was used to access potential changes in the molecular crystals upon crosslinking. All samples displayed the cellulose I crystalline diffraction pattern, with the main intensity peaks at 2Θ for 14.9°, 16.8°, and 22.8°, corresponding to (1$\bar{1}$0); (110), and (200) crystal planes, respectively. X-ray diffraction analyses showed that the intrinsic diffraction pattern of the CNC was not modified through crosslinking process as accessible OH— groups at the [110] and [1$\bar{1}$0] facets of CNC were kept intact about the 2θ peak positions, keeping their cellulose I signature and confirming that only intermolecular OH— were involved to form crosslinked CNCs (xCNCs). Additionally, it was observed that diffractogram peak intensities decreased as the concentration of GA increased as opposed to EC, suggesting OH— groups have the same position in the crystal structure with tunable elastic deformation during reorganization of molecular crystals in the hydrogel. It is worthwhile to note that where reference is made herein to a method comprising temperatures above 60° C., a modification of the crystal structure might occur, causing CNC of cellulose I to evolve into cellulose II.

Figure 6:
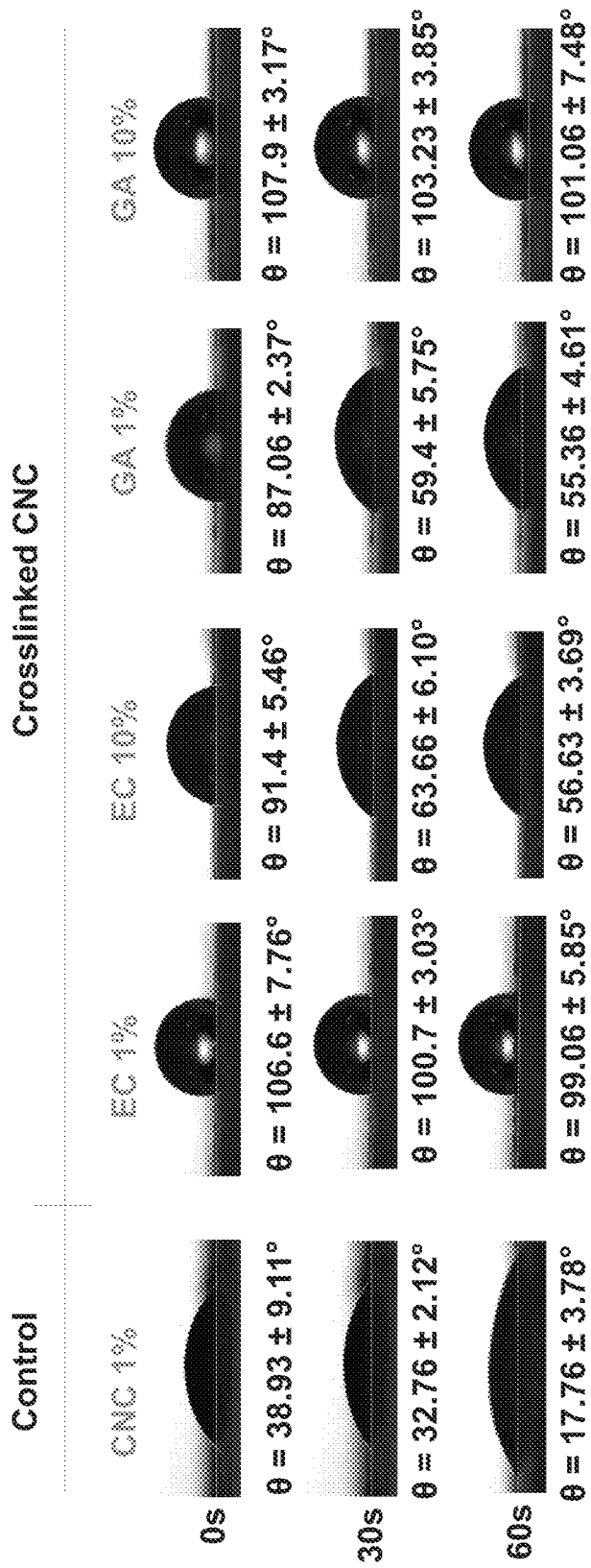
FIG. 6 is a graphical representation of water contact angle measurements for CNC and their crosslinked forms at varied concentration of GA and EC in accordance with an illustrative embodiment of the invention disclosed herein. The graphical representation shows the wettability evaluation with contour droplet images taken from their dynamic analysis at their varied drop age of 0 s (at contact), 30 s (at equilibrium), and 60 s (after equilibrium).

Turning now to FIG. 6, droplet images constitute the wettability of the CNC networks before and after crosslinking through water contact angle (WCA) measurements. When a water droplet is deposited on a solid surface, the droplet competes with the air to occupy a larger contact area with the solid surface. This phenomenon is followed by an equilibrium state that leads to a WCA between the solid-liquid and liquid-gas. The interaction of CNC and their crosslinked surfaces on the wettability were assessed under dynamic contact angles over 60 s. The graphics in FIG. 6 illustrate WCA as a function of drop age with hydrophobic values. The considerable increase in the hydrophobicity of the modified CNC networks was demonstrated by the corresponding increase in their contact angle with water. Intermolecular H-bonds at the CNC interfaces make them hydrophilic in nature, which is mostly due to their exposed and abundant hydroxyl groups. WCA values greater than 90° indicate surface hydrophobicity and below 90° correspond to hydrophilicity of the surface, with the latter indicating that examined coated surfaces are characterized by high wettability. This variation in CA indicates the hydrophilic wetting character of pristine CNCs and the role that crosslinking played in the modification of their networks, tuning their wettability from hydrophilic to hydrophobic surfaces. Due to the modification of the hydroxyl groups by epoxy-based (example of EC) and aldehyde-based (example of GA) crosslinkers, the increase in contact angle can be explained by a decrease of the total surface energy of the crosslinked CNCs. The increase in WCA is qualitatively comparable to the degree of crosslinking as determined from the viscoelastic behavior of hydrogels, indicating that the change in surface water adsorption is related to the intermolecular connection between adjacent CNCs.

For purposes of the instant disclosure, the term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Thus, the invention is well adapted to carry out the objects and attain the ends and advantages mentioned above as well as those inherent therein. While the inventive concept has been described and illustrated herein by reference to certain illustrative embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A method for preparing crosslinked colloidal cellulose nanocrystals (xCNC), said method comprising the steps of:
preparing or providing a suspension of positively or negatively charged colloidal cellulose nanocrystals (CNC) in an aqueous medium;
ia) adjusting the CNC suspension in the aqueous medium to an acidic pH; and, optionally with heating, ib) mixing the CNC suspension of step ia) with a dialdehyde crosslinker under the acidic pH; or iia) adjusting the CNC suspension in the aqueous medium to an alkaline pH; and, with heating to a temperature from above 60° C. to about 160° C., iib) mixing the CNC suspension of step iia) with an epoxide-based crosslinker under the alkaline pH;
isolating the xCNC after step ib) or step iib).

2. The method of claim 1 wherein the aqueous medium is deionized water.

3. The method of claim 1 wherein the dialdehyde crosslinker is glyoxal, malondialdehyde, succinaldehyde, clavaldehyde, adipaldehyde, suberaldehyde, glutaraldehyde, or a mixture thereof.

4. The method of claim 3 wherein the dialdehyde crosslinker is glutaraldehyde.

5. The method of claim 1 wherein the epoxide-based crosslinker is epichlorohydrin, polyepichlorohydrin, an epoxyalkane, allyl glycidyl ether, alkyl glycidyl ether, cycloalkene oxide, 1,3-butanediene diepoxide, epoxidized oils, or a mixture thereof.

6. The method of claim 5 wherein the epoxide-based crosslinker is epichlorohydrin.

7. The method of claim 1 wherein the alkaline pH is from about 7 to about 10.

8. The method of claim 7 wherein the alkaline pH is about 10.

9. The method of claim 1 wherein the acidic pH is from about 2 to about 7.

10. The method of claim 9 wherein the acidic pH is about 2.5.

11. The method of claim 1 wherein the adjusting step ia) is conducted with a Lewis acid, a mineral acid, a carboxylic acid, or a mixture or combination thereof.

12. The method of claim 11 wherein the mineral acid or the carboxylic acid further comprises hydrochloric acid, formic acid, acetic acid, nitric acid, or a mixture or combination thereof.

13. The method of claim 1 wherein the adjusting step iia) is conducted with a Lewis base, a monoacidic, a diacidic base, or a mixture or combination thereof.

14. The method of claim 13 wherein the monoacidic base or the diacidic base further comprises sodium hydroxide, calcium hydroxide, potassium hydroxide, barium hydroxide, or a mixture or combination thereof.

15. The method of claim 1 wherein the isolating step comprises precipitation, filtration or centrifugation, or a combination thereof.

16. The method of claim 1 further comprising the step of selectively tuning the degree of crosslinking between the CNC suspension and the dialdehyde crosslinker of step ib) or the epoxide-based crosslinker of step iib).

17. The method of claim 1 wherein said positively or negatively charged CNC further comprises a positively or negatively charged sulphonated CNC.

18. The method of claim 1 wherein said positively or negatively charged CNC are extracted from biomass, a cellulosic source, or a combination thereof.

19. The method of claim 18 wherein the biomass, the cellulosic source, or both further comprise an amine ($NH_2$)-terminated molecule.

20. A method for preparing a crosslinked colloidal cellulose nanocrystal (xCNC), said method comprising the steps of:
preparing or providing a suspension of sulfonated colloidal cellulose nanocrystals (CNC) in an aqueous medium;
ia) adjusting the sulfonated CNC suspension in the aqueous medium to an acidic pH;

ib) optionally with heating, mixing the sulfonated CNC suspension of step ia) with a dialdehyde crosslinker under the acidic pH; and isolating the xCNC after step ib).

21. The method of claim 20 wherein the sulfonated CNC further comprises positively or negatively charged sulfonated CNC.

22. The method of claim 20 wherein the dialdehyde crosslinker is glyoxal, malondialdehyde, succinaldehyde, clavaldehyde, adipaldehyde, suberaldehyde, glutaraldehyde, or a mixture thereof.

23. The method of claim 22 wherein the dialdehyde crosslinker is glutaraldehyde.

24. The method of claim 20 wherein the optional heating step ib) is from about 60° C. to about 160° C.

25. The method of claim 20 wherein the acidic pH is from about 2 to about 7.

26. The method of claim 25 wherein the acidic pH is about 2.5.

27. The method of claim 20 wherein the adjusting step ia) is conducted with a Lewis acid, a mineral acid, a carboxylic acid, or a mixture or combination thereof.

28. The method of claim 27 wherein the mineral acid or the carboxylic acid further comprises hydrochloric acid, formic acid, acetic acid, nitric acid, or a mixture or combination thereof.

29. The method of claim 20 wherein the isolating step comprises precipitation, filtration or centrifugation, or a combination thereof.

30. The method of claim 20 further comprising the step of selectively tuning the degree of crosslinking between the sulfonated CNC suspension and the dialdehyde crosslinker of step ib).

31. A method for preparing a crosslinked colloidal cellulose nanocrystal (xCNC), said method comprising the steps of:

preparing or providing a suspension of sulfonated cellulose nanocrystals (CNC) in an aqueous medium;

ia) adjusting the sulfonated CNC suspension in the aqueous medium to an alkaline pH;

ib) with heating to a temperature from above 60° C. to about 160° C., mixing the sulfonated CNC suspension of step ia) with an epoxide-based crosslinker under the alkaline pH; and isolating the xCNC after step ib).

32. The method of claim 31 wherein the sulfonated CNC further comprises positively or negatively charged sulfonated CNC.

33. The method of claim 31 wherein the epoxide-based crosslinker is epichlorohydrin, polyepichlorohydrin, an epoxyalkane, allyl glycidyl ether, alkyl glycidyl ether, cycloalkene oxide, 1,3-butanediene diepoxide, epoxidized oils, or a mixture thereof.

34. The method of claim 33 wherein the epoxide-based crosslinker is epichlorohydrin.

35. The method of claim 31 wherein the alkaline pH is from about 7 to about 10.

36. The method of claim 35 wherein the alkaline pH is about 10.

37. The method of claim 31 wherein the adjusting step ia) is conducted with a Lewis base, a monoacidic, a diacidic base, or a mixture or combination thereof.

38. The method of claim 37 wherein the monoacidic base or the diacidic base further comprises sodium hydroxide, calcium hydroxide, potassium hydroxide, barium hydroxide, or a mixture or combination thereof.

39. The method of claim 31 wherein the isolating step comprises precipitation, filtration or centrifugation, or a combination thereof.

40. The method of claim 31 further comprising the step of selectively tuning the degree of crosslinking between the sulfonated CNC suspension and the epoxide-based crosslinker of step ib).

* * * * *